Figure 1:
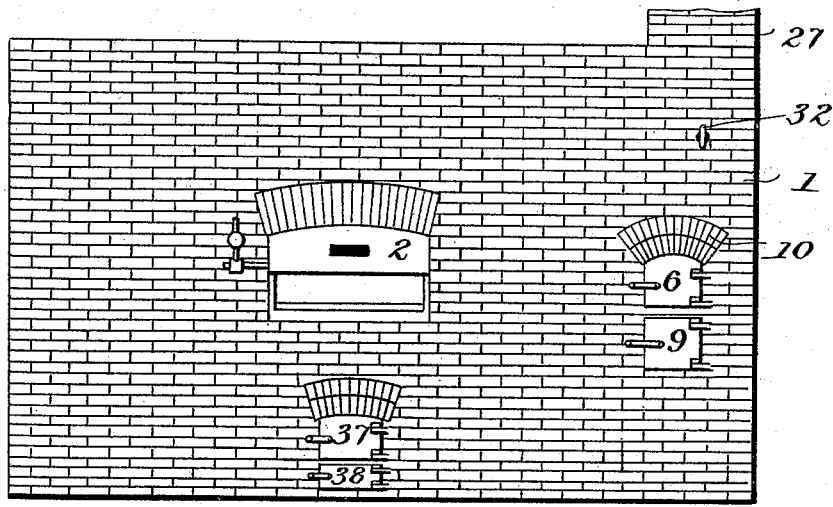

(No Model.) 2 Sheets—Sheet 1.

G. THOM.
BAKER'S OVEN.

No. 534,981. Patented Feb. 26, 1895.

Witnesses
J. F. Hinkel
E. E. Ellis

Inventor
George Thom
by Foster & Freeman
Attorneys (No Model.) 2 Sheets—Sheet 2.

G. THOM.
BAKER'S OVEN.

No. 534,981. Patented Feb. 26, 1895.

Witnesses
J. G. Hinkel
E. E. Ellis

Inventor
George Thom
by Foster & Freeman
Attorneys

UNITED STATES PATENT OFFICE.

GEORGE THOM, OF WASHINGTON, DISTRICT OF COLUMBIA, ASSIGNOR OF ONE-THIRD TO EDWARD GRAVES, OF SAME PLACE.

BAKER'S OVEN.

SPECIFICATION forming part of Letters Patent No. 534,981, dated February 26, 1895.

Application filed November 8, 1894. Serial No. 528,239. (No model.)

*To all whom it may concern:*

Be it known that I, GEORGE THOM, a citizen of the United States, residing at Washington, in the District of Columbia, have invented certain new and useful Improvements in Bakers' Ovens, of which the following is a specification.

This invention relates to certain new and useful improvements in bakers' ovens, and it consists substantially in such features of construction, arrangement, and combinations of parts as will hereinafter be more particularly described.

It has been proposed heretofore to provide ordinary "inside" bakers' ovens of a construction by which either through direct or indirect passages or flues the products of combustion are passed from the fire-chamber into and through the baking chamber, and thence around in such manner as to thoroughly heat the walls of the oven, and finally to pass out through the usual exit flue or chimney provided at some convenient part of the oven for the purpose of creating a draft as well as to enable a proper regulation of heat through the medium of a suitable damper. Such a type or form of bakers' oven possesses the advantage of heating the baking chamber quite rapidly and to a somewhat thorough degree; but the great disadvantage attendant upon the use of such an oven is that bread and other articles placed in the baking chamber very often receive deposits of soot and other solid matters thereon which of course destroy the articles, thereby incurring both the loss of material as well as the waste of time and labor.

The object of the present invention is to overcome all of the disadvantages of what is known as an "inside" baker's oven, and to at the same time, include all of the advantages of such form of oven in the general construction and operation thereof, as well as to provide certain additional advantageous features heretofore needed.

A further object of the present invention is to provide for the thorough and effective heating of the oven, both throughout the walls thereof, as well as throughout the baking-chamber, without in any manner permitting or allowing the products of combustion to pass into or through said baking chamber.

A still further object of the present invention is to provide means for quickly increasing the heat of the baking hearth when required to bake the under side of articles to a greater extent than the upper surfaces thereof; and also to provide a furnace embodying generally in its construction the features of simplicity of construction, ease and rapidity of operation, as well as economy in the amount of fuel necessary to operate the same.

These objects I attain by the means illustrated in the accompanying drawings, in which—

Figure 2:
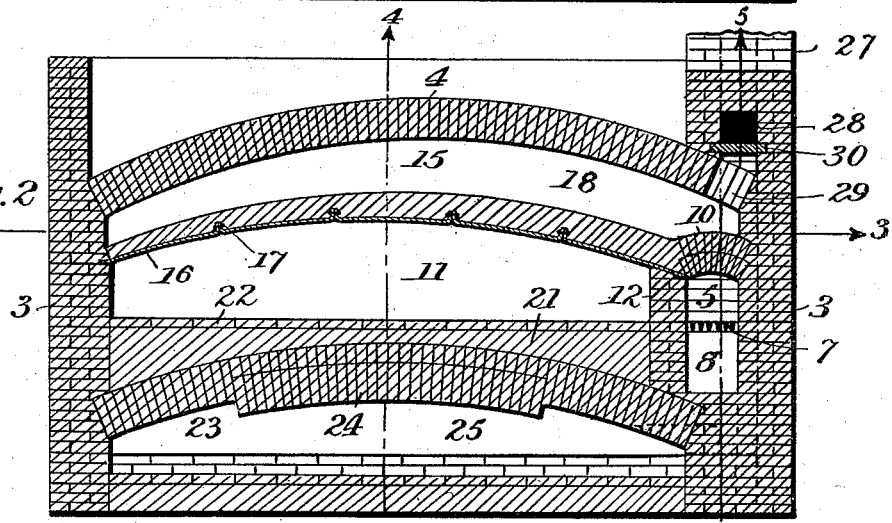
Figure 3:
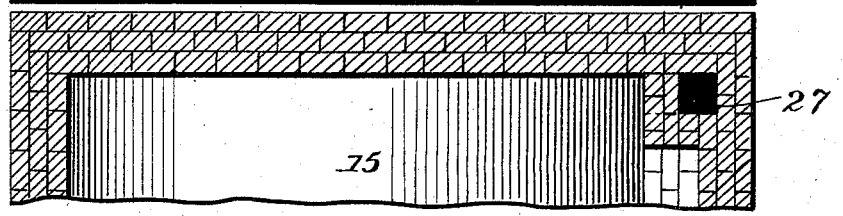
Figure 4:
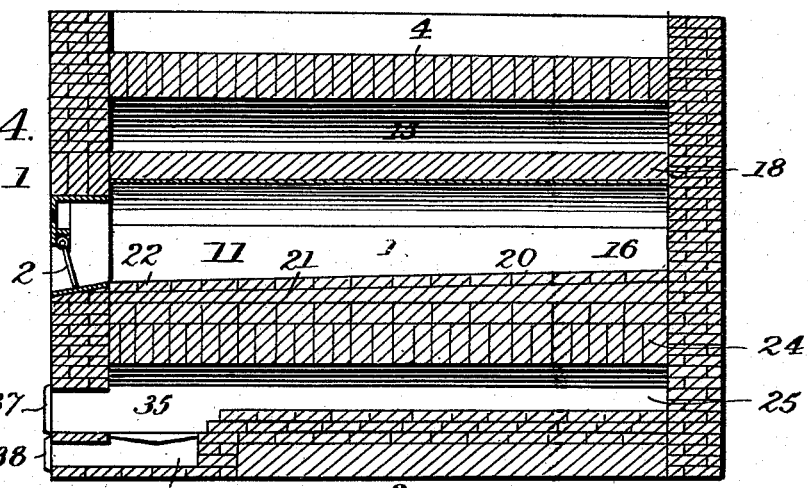
Figure 5:
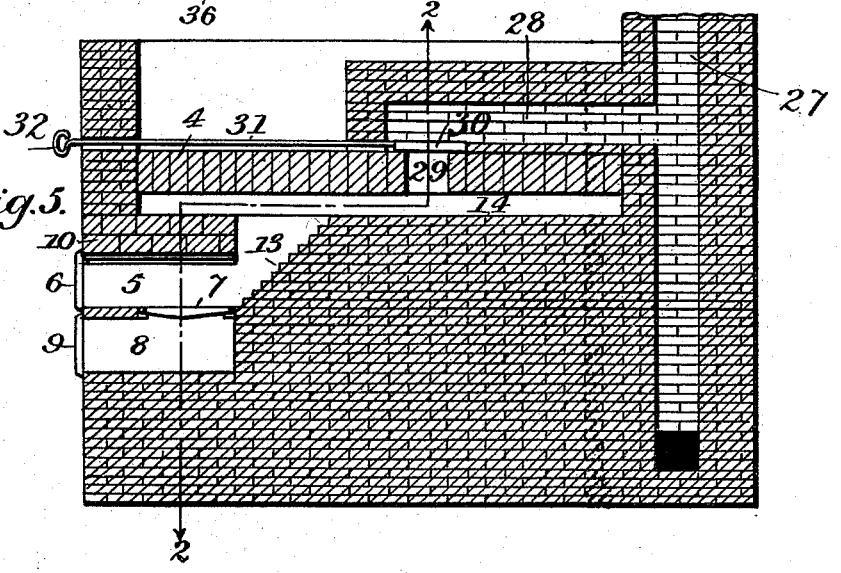
Figure 6:
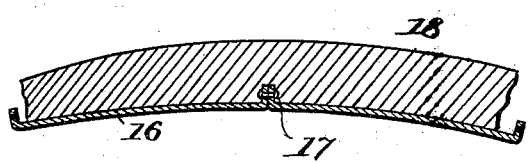

Figure 1 is a front elevation of a baker's oven embodying my improvement. Fig. 2 is a vertical sectional elevation of my improved oven taken on the line 2—2 of Fig. 5. Fig. 3 is a horizontal sectional view taken on the line 3—3 of Fig. 2; and Fig. 4 is a longitudinal sectional elevation taken on the line 4—4 of Fig. 2. Fig. 5 is also a longitudinal sectional view taken on the line 5—5 of Fig. 2. Fig. 6, is an enlarged sectional view in detail, representing more clearly the form of curved plates which separate the baking-chamber from the upper or sub-chamber.

In carrying my invention into effect I provide the oven of ordinary brick-work or masonry, and usually construct the same of rectangular shape, although it is evident that the particular shape thereof is immaterial.

As shown in the accompanying drawings, 1, indicates the front of the oven and 2, indicates or represents a door of any ordinary construction leading to and furnishing access to the interior of the baking chamber.

The sides of the oven are constructed of the walls 3, 3, and connecting these walls at a suitable height from the top is the usual crown 4, over the top of which a quantity of sand may be placed if desired so as to retain the heat of the products of combustion, and thereby maintain the walls of the furnace in a more heated condition. On the right-hand side of the oven as shown in the several sectional views, I have provided a fire-chamber 5, closed at the front by a suitable door 6, the said fire-chamber being provided with a grate 7, beneath which there is an ash-pit 8, also closed at the front by a suitable door 9. Above the said fire-chamber is a double arch 10, which serves to protect the masonry above the same from extreme heat, as well also as that portion of the crown 4 which extends above the same. The said fire-chamber, furthermore, is divided or separated from the baking-chamber 11 by means of an inner wall 12 of brick-work or masonry, while the masonry or brick-work to the rear of the fire-chamber gradually recedes backwardly in step-like fashion as shown at 13, Fig. 5, until the height 14 is reached, whereat communication is effected between the space leading from the rear of the fire-chamber to a sub-chamber 15 extending over the baking-chamber for its entire surface or extent. This space which affords communication between the fire-chamber and sub-chamber extends practically the whole depth of the furnace, and thereby permits entrance of the products in about equal volume at all points of such communication and more evenly heats the top and bottom of said sub-chamber. The said baking-chamber 11 and sub-chamber 15 are divided or separated from each other horizontally by means of a metallic diaphragm or cover preferably made up of separate plates 16, which extend from front to rear of the furnace or baking-chamber, and which as shown are curved from one side of the oven to the other with their concaved faces downward, and they are joined along their longitudinal edges by means of bolts or rivets 17 which may be screwed up to the proper degree of tightness and then secured by nuts, or if desired, the said plates could be secured together longitudinally in any other suitable manner which would permit them to be held together with a slightly yielding action. As will be observed the said diaphragm is supported on the one side by means of one of the outer walls 3, while at the other side, it is supported by resting on top of the inner wall 12, which, as hereinbefore stated, separates or divides the main baking-chamber from the fire-chamber 5. The purpose of said diaphragm or cover and inner wall 12 is to provide for the thorough heating of the baking-chamber without allowing or permitting any of the products of combustion to pass into or through the baking-chamber, and as will hereinafter be more particularly explained, it will be seen in what manner this desirable object is effected.

From the construction and arrangement of the diaphragm, it will be seen that due provision is had for the expansion and contraction thereof caused by the variations of heat, and preferably in order to assist in furnishing as great a conductivity of heat as possible, I cover the upper surfaces of said diaphragm with suitable cement or brickwork 18, which in addition lends somewhat to the strength of the entire structure. In order that there shall be as equal a distribution of heat above the baking-chamber 11 as is possible to be had, I preferably gradually reduce the thickness of the covering of cement or brick-work 18 from right to left, thus producing uniform heat and preventing flashing.

At the point of the sub-chamber where the products of combustion enter from the fire-chamber the heat is of course much greater, and for such reason I prefer that said sub-chamber shall be a little higher at that point than at its other end. Thus the sub-chamber is so shown and by virtue thereof the crown at this point will not be subjected to too great a heat and will thereby last much longer. The products will also be more equally distributed throughout said sub-chamber.

As will be seen by the dotted lines in Fig. 3, the front or forward corners of the baking-hearth 20 are given a beveled turn by reason of the brick-work being built up in the usual manner of furnaces so as to facilitate the withdrawal of pans from the baking-chamber. The baking-hearth 20 inclines a little toward the front as shown in Fig. 4, and which is also a usual construction, and the said hearth may be built up or formed from any suitable material preferably of cement 21 and an upper layer of brick-work 22. The particular materials employed in the construction of the hearth, however, will be understood as forming no particular part of my invention. Beneath the baking-hearth from front to rear thereof, and built into the side walls of the oven is a curved arch 23, which is formed with a wider portion or key 24, also extending from front to rear so as to divert the heat at the center and to protect the central portion of the oven at the front, when a fire is built in the bottom chamber as will be hereinafter described. The said arch 23 constitutes a roof or crown of a bottom chamber 25, and as will be observed upon reference to Figs. 2, 4, and 6, the said bottom chamber communicates with the sub-chamber through a flue 26 located at the left-hand front corner of the oven, while at the rearward right-hand corner of the oven said bottom chamber communicates with the up-take or chimney 27 leading to the external atmosphere.

Located above and to the rear of the fire-chamber 5, and communicating with the space which conducts the products of combustion into the upper or sub-chamber 15 is a passage or channel 28, leading also to the up-take or chimney 27, the communication between such passage and the space referred to being had by means of a short passage-way 29 controlled by a damper 30, having a suitable operating rod 31 passing out through an opening in the front of the oven, and formed or provided with a handle 32 by means of which said damper is controlled or operated. As will be observed on reference to Fig. 4, the said bottom chamber 25 is built up sufficiently from the ground to form a substantial base for the oven, while at the forward part of said bottom chamber, preferably centrally of the oven and beneath the opening which leads to the baking-chamber is a fire-chamber or grate 35, beneath which is an ash-pit 36, the said fire-chamber and ash-pit being closed respectively by doors 37 and 38. In this way whenever it is desirable to heat the hearth of the baking-chamber to an extent by which the bottoms of pies, cakes, and the like will be baked or browned to a greater extent, all that is necessary to do is to build a fire in said bottom chamber, and the desired results will be obtained in an obvious manner.

From the foregoing description it is thought the construction and arrangement of my improved baker's oven will be fully understood.

To start the oven, a fire is built in the fire-chamber 5, the damper 30 having been previously closed so as to cause the products of combustion to pass upwardly and through the furnace in the desired direction. The products of combustion pass upwardly from said fire-chamber and enter the upper or sub-chamber 15 through the space which communicates with said fire-chamber. The direction of the draft will then be such as to cause the products to pass down through the flue 26 in the front left-hand corner of the baking-chamber. Thence such products will take a sweeping course into and across the bottom chamber in a diagonal direction, and enter the up-take or chimney 27 through the opening at the rearward right-hand corner of the oven leading to said chimney. In this way, it will be seen that none of the products can possibly enter the baking chamber 11, while at the same time, said chamber is maintained at a uniform degree of heat sufficient for all the purposes of ordinary baking; and then as hereinbefore stated when greater heat is desired for the bottoms of loaves of bread or pies, the fire is made up in the bottom chamber. Should the oven become too hot, it is simply necessary to draw the damper 30 outwardly by means of its operating rod, whereupon the products of combustion will follow the more direct course to the chimney and pass out through the channel 28 by means of the passage-way 29. It will be thus observed that the oven is under complete control of the operator, and that the heating of the baking chamber as well as the walls of the oven can be regulated and maintained to almost any degree desired.

It will be understood that I am not limited as to the particular form of metallic diaphragm or cover, since various immaterial changes in the construction thereof could be resorted to and still be within the scope of my invention.

Furthermore, without limiting myself in other connections to the precise details of construction herein shown and described, I claim—

1. A baker's oven constructed with a baking chamber closed all around against admission of the products of combustion, a sub-chamber into which such products pass from the fire-chamber, and a communicating space between the two chambers extending practically the full depth of the furnace, substantially as described.

2. A baker's oven constructed with a baking chamber, closed all around against admission of the products of combustion, and having a sub-chamber into which said products pass from the fire-chamber, the said chambers being separated or divided by a metallic diaphragm comprising separate plates extending from front to rear of the furnace and joined along their longitudinal edges by suitable means, substantially as described.

3. A baker's oven constructed with a baking-chamber closed all around against admission of the products of combustion, and having a sub-chamber into which such products pass from the fire-chamber, the said chambers being separated or divided by a metallic diaphragm covered with masonry or cement gradually decreasing in thickness as it recedes from the fire-chamber, substantially as shown and for the purpose described.

4. A baker's oven constructed with a baking-chamber closed all around against admission of the products of combustion, an upper or sub-chamber receiving such products from the fire-chamber, a lower chamber provided with a fire-grate and pit and communicating with said upper chamber by a flue, and a chimney or up-take also communicating with said lower chamber by a flue arranged at a point diagonal to the first, substantially as described.

5. A baker's oven constructed with a baking-chamber closed all around against admission of the products of combustion, a fire-chamber located at one side of the oven and separated from the baking-chamber by an inner wall, a sub-chamber above the baking-chamber, a lower or bottom chamber, a space leading from the fire-chamber to said sub-chamber, and suitable connecting flues and a chimney, substantially as described.

6. A baker's oven constructed with a baking-chamber closed all around against admission of the products of combustion, a sub-chamber receiving such products from the fire-chamber, a bottom chamber and connecting flue, the chimney, and the channel and passage-way, the latter controlled by the damper, substantially as shown and described.

7. A baker's oven constructed with a baking chamber and bottom chamber, said chambers being separated by an arch having a central key or thickened portion extending from front to rear of the oven and serving to distribute the heat uniformly in the passage of the products of combustion through said bottom chamber, substantially as described.

In testimony whereof I have signed my name to this specification in the presence of two subscribing witnesses.

GEORGE THOM.

Witnesses:
WILLIAM T. MYERS,
JAMES CAMPBELL.